United States Patent [19]
Gaus

[11] Patent Number: 5,547,085
[45] Date of Patent: Aug. 20, 1996

[54] STORAGE CAROUSEL FOR COMPACT DISC RECORDING AND THE LIKE

[76] Inventor: Douglas M. Gaus, 207 Augustine Dr., Martinez, Calif. 94553

[21] Appl. No.: 289,313

[22] Filed: Aug. 11, 1994

[51] Int. Cl.[6] .................................................. A47F 7/00
[52] U.S. Cl. ........................... 211/40; 211/163; 312/9.46
[58] Field of Search ............................. 211/40, 41, 163, 211/131; 312/9.9, 9.45, 9.46; 206/309

[56] References Cited

U.S. PATENT DOCUMENTS

| | | | |
|---|---|---|---|
| 2,690,843 | 10/1954 | Ament | 211/40 |
| 3,736,036 | 5/1973 | Mathus | 312/9.46 X |
| 4,756,429 | 7/1988 | Lehman et al. | 211/43 |
| 4,815,795 | 3/1989 | Accumanno et al. | 312/9.46 |
| 5,031,779 | 7/1991 | Szenay et al. | 211/40 |
| 5,117,984 | 6/1992 | Kennedy | 211/40 X |
| 5,176,264 | 1/1993 | DePalma | 211/40 |
| 5,346,079 | 9/1994 | Price et al. | 211/163 X |

Primary Examiner—Robert W. Gibson, Jr.
Attorney, Agent, or Firm—Schapp and Hatch

[57] ABSTRACT

Compact recording disc storage carousels each of which includes at least two circular platforms separated by fixed vertical pillars and having therebetween a pair of movable pillars each of which is so juxtaposed to a pair of said fixed pillars as to be capable of maintaining an array of compact recording disc cases between them in face-to-face contacting relationship, and a backstop arrangement capable of preventing said compact recording disc cases of said array from passing so far between said platforms that their spines are spaced from the peripheries of the lower ones of said platforms by more than a predetermined distance.

6 Claims, 4 Drawing Sheets

STORAGE CAROUSEL FOR COMPACT DISC RECORDING AND THE LIKE

BACKGROUND OF THE INVENTION

1. Field of the Invention

My present invention relates to compact disc recordings, and more particularly to apparatus for organizing and storing compact disc recordings contained in their protective cases.

2. Description of the Prior Art

Compact disc storage carousels for storing and organizing compact discs contained in their protective cases are well known in the prior art.

U.S. Pat. No. 5,031,779, issued to Joseph A. Szenny, et al., on Jul. 16, 1991, and entitled COMPACT DISC STORAGE CAROUSEL, discloses a carousel for storing and displaying compact disc albums or cases which comprises one or more reels rotatably mounted on a turntable base wherein the reels include a central core and a pair of parallel spaced-apart discs having sets of parallel ribs disposed at equal angular positions around the core. The dimensions of this compact disc storage carousel are such that compact disc cases readily fit between pairs of adjacent discs and are held upright by engagement with adjacent pairs of ribs formed on the discs. When a reel populated with a plurality of compact disc cases is placed on the base, it may be rotated so as to bring the cases into view for selection of a particular recording for play.

U.S. Pat. No. 5,176,264, issued to Michael J. De Palma on Jan. 5, 1993, discloses a circular, stackable, rotatable display case for floppy discs/compact discs and the like which consists of a mechanism for radially storing a plurality of the floppy discs/compact discs and the like and another mechanism for rotating the radially storing mechanism, so that any one of the floppy discs/compact discs and the like can be selectively removed from the radially storing mechanism.

Such prior art compact disc storing carousels are characterized by the fact that the protective cases of the compact discs stored therein are radially disposed, i.e., the planes of the major faces of all of the compact disc cases stored therein are located on opposite sides of the axis of the carousel, and thus the number of compact disc cases which can be stored therein is severely limited.

It is believed that U.S. Pat. No. 4,756,429, issued to Marcus S. Lehman on Jul. 12, 1988, and entitled CAROUSEL DATA HOLDER, contains information which is or might be considered to be material to the examination of this patent application.

No representation or admission is made that any of the above-listed documents is part of the prior art, or that an exhaustive search has been made, or that no more pertinent information exists.

The term "prior art" as used herein or in any statement made by or on behalf of applicant means only that any document or thing referred to as prior art bears, directly or inferentially, a date which is earlier than the effective filing date hereof.

A copy of each of the above-listed documents is supplied to the United States Patent and Trademark Office herewith.

SUMMARY OF THE INVENTION

Accordingly, it is an object of my present invention to provide storage carousels for compact recording discs and the like which are characterized by storage efficiencies not achieved by the compact disc storage carousels of the prior art.

Another object of my present invention is to provide compact disc storage carousels which achieve the above object and at the same time permit the user to easily read the identifying matter which is visible through the outer face of each compact disc case stored thereon.

Yet another object of my present invention is to provide compact disc storage carousels for storing compact discs in their cases, wherein the adjacent ones of the stored cases are maintained in face-to-face contacting relation when stored.

A further object of my present invention is to provide compact disc storage carousels from which any selected one of the stored disc cases can be withdrawn from its storage position, and thus rendered easily graspable, by a single human finger, despite the fact that these cases are considerably narrower than an adult human finger.

Yet another object of my present invention is to provide compact disc storage carousels which achieve all of the above objects and can be stacked vertically so as to form a single, multi-level compact disc storage unit.

A further object of my present invention is to provide compact disc storage carousels the compact disc case supporting surfaces of which are free of disc case guides between which compact disc cases to be stored therein must be individually manually inserted.

A yet further object of my present invention is to provide compact disc storage carousels which can carry partial loads of compact discs in their cases without the use of fixed disc case locators or positioning guides for each disc which can be stored therein.

An additional object of my present invention is to provide compact disc storage carousels which are so constructed and arranged that a single compact disc case can be manually inserted between two adjacent pluralities of compact disc cases already stored therein without individually moving each one of the discs of one of those pluralities from a fixed storage location to an adjacent fixed storage location.

Another object of my present invention is to provide compact disc storage carousels which achieve one or more of the above objects and in which a plurality of stored compact disc cases can be simultaneously displaced to make room for the insertion of another compact disc case without disturbing other compact disc cases stored therein.

Yet another object of my present invention is to provide compact disc storage carousels which achieve several of the above objects and yet can be easily and cheaply fabricated from diverse types of materials, including natural wood, plastics, composite materials, and metals.

A further object of my present invention is to provide compact disc storage carousels which include movable disc case supports adapted for holding erect compact disc cases which are stored therein.

A yet further object of my present invention is to provide compact disc storage carousels which achieve the previously stated object, and the moveable disc case supports of which are captive in the carousel structure and thus cannot be lost.

Another object of my present invention is to provide compact disc storage carousels which can easily be assembled by the purchasers thereof, and thus can economically be shipped and stored in partially assembled form.

An additional object of my present invention is to provide storage carousels which can accommodate mixtures of single and double disc cases in any desired numbers and orders.

A further object of my present invention is to provide storage carousels for compact recording discs the principles and unique features of which can also be applied to the storage of other data storage devices, e.g., CD-ROMs, video cassettes, books, "floppy" computer data storage discs, audio tapes, etc.

Other objects of my present invention will in part be obvious, and will in part appear hereinafter.

My present invention, accordingly, comprises the features of construction, combinations of elements, and arrangements of parts, all as exemplified in the following disclosure, and the scope of my present invention will be indicated in the claims appended hereto.

In accordance with a principal feature of my present invention a storage carousel for compact recording discs and the like is provided which is comprised of a lower platform rotatable about a vertical axis and adapted for carrying a plurality of compact disc cases, said lower platform being provided with stops and disc case support means, said stops and support means being so arranged as to be capable of maintaining an array of compact disc cases substantially perpendicular to said lower platform.

In accordance with another principal feature of my present invention said stops and support means (or array defining means) are so arranged on said lower platform that at least some of the compact disc cases of said array are in contact with each other over a major part of their confronting major faces.

In accordance with yet another principal feature of my present invention the number of said stops and supporting means on the lower platform of a particular embodiment of my present invention is less than one-half of the maximum number of compact disc cases in said array.

In accordance with a further principal feature of my present invention at least one of said support means is movable over the upper surface of said lower platform, toward and away from a further pair of said support means, and thus different numbers of compact disc cases can be maintained between said one of said support means and said further pair of said support means.

In accordance with a yet further principal feature of my present invention said stop means is so located on said upper surface of said lower platform as to maintain the spines of the compact disc cases of said array close to the periphery of said lower platform.

In accordance with an additional principal feature of my present invention said storage carousel for compact recording discs and the like is further comprised of an upper platform, and said upper platform is affixed to the upper ends of at least some of said support means.

In accordance with another principal feature of my present invention said movable support means is supported by said upper platform and said lower platform.

In accordance with yet another principal feature of my present invention the upper and lower ends of said movable support means are captive, respectively, in a groove in the upper face of said lower platform and in a groove in the lower face of said upper platform.

In accordance with a further principal feature of my present invention eacg if said movable support means is provided, at its opposite ends, with a lower foot member and an upper foot member.

In accordance with a yet further principal feature of my present invention the upper foot member of each of said movable support means is slidably captive in a groove in the lower face of said upper platform, and the lower foot member of each of said movable support means is slidably captive in a groove in the upper face of said lower platform.

In accordance with another principal feature of my present invention the lower foot member of each of said movable support means includes a projecting toe portion which projects toward the cooperating pair of said support means, and the upper face of said projecting toe portion is elevated with respect to the upper surface of said lower platform, whereby said projecting toe portion is adapted to be frictionally engaged with at least the compact recording disc case of said array adjacent it.

In accordance with a further principal feature of my present invention the lower face of said upper platform is spaced from the upper edges of said compact recording disc cases of said array, whereby a human finger may be brought into contact with the upper face of any selected one of the compact recording disc cases of said array, whereby to separate said one compact recording disc case from its adjacent compact recording disc cases for easy grasping and removal of said one compact recording disc cases from said carousel.

For a fuller understanding of the nature and object of my present invention, reference should be had to the following detailed description, taken in connection with the accompanying drawings.

DESCRIPTION OF THE PREFERRED EMBODIMENTS

Figure 1:
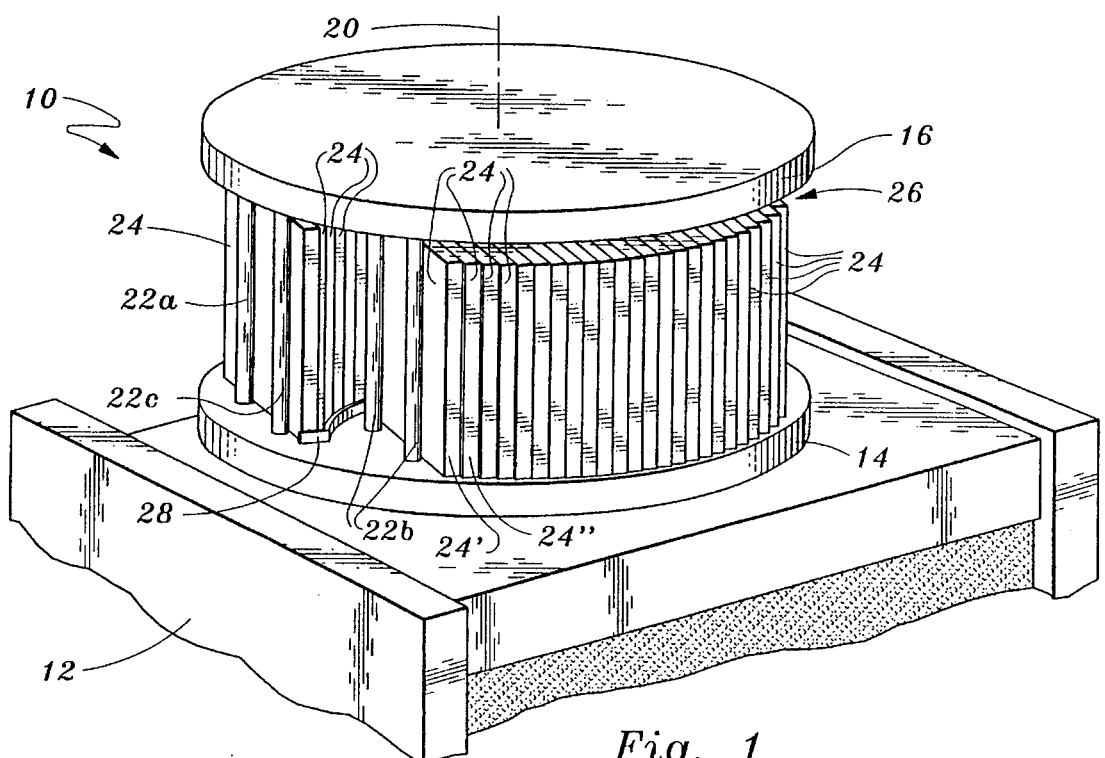
FIG. 1 is a perspective view of a compact disc recording storage carousel of the present invention disposed upon the top surface of an audio equipment cabinet of well known type.

Referring now to FIG. 1, there is shown a compact disc recording storage carousel 10 of the first preferred embodiment of my present invention, which is disposed upon the top surface of an audio equipment cabinet 12 of well known type.

As further seen in FIG. 1, carousel 10 is comprised of a lower circular platform 14 and an upper circular platform 16.

Figure 1A:
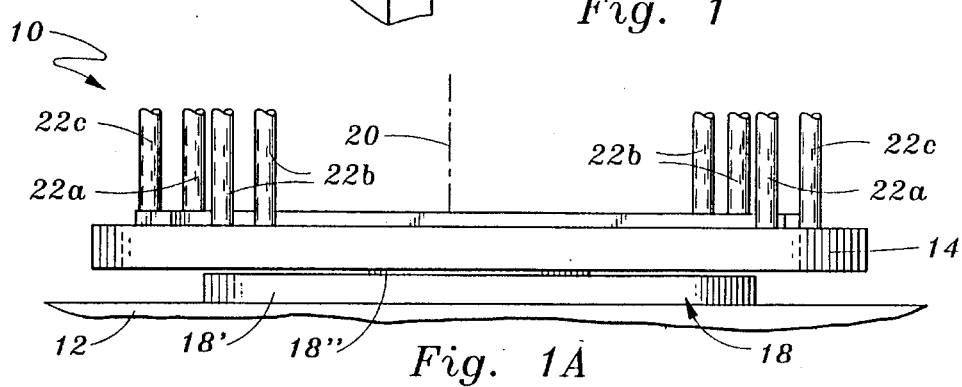
FIG. 1A is an elevational view of the compact disc recording storage carousel of my invention shown in FIG. 1, particularly illustrating the "lazy Susan" bearing upon which the remainder of the compact disc recording storage carousel of the invention is supported.

As seen in FIG. 1A, carousel 10, which is shown in part only in FIG. 1A, is further comprised of a rotary turntable bearing 18 of the type sometimes called a "lazy Susan" bearing by means of which all of the other parts of carousel 10 are made freely manually rotatable about a vertical axis 20.

As may be seen from FIGS. 1 and 1A, vertical axis 20 passes through the centers of circular platforms 14 and 16.

Turntable bearing 18 may be one of the many turntable bearings which are commercially available, and thus it is to be understood that turntable bearing 18 is not itself a critical feature of the present invention.

In the well known manner, turntable bearing 18 is comprised of a body 18' and a rotor 18", rotor 18" being freely rotatable with respect to body 18'.

In the first preferred embodiment of my present invention rotor 18" of turntable bearing 18 is fastened to the lower surface of lower platform 14.

It is to be understood that carousel 10, including turntable bearing 18, is deposited upon the top surface of equipment cabinet 12, and that bearing body 18' is not in any way attached to equipment cabinet 12.

While circular platforms 14, 16 are preferably fabricated of quality wood, presenting a pleasing grain to the eye of the user, it is to be understood that circular platforms 14, 16 may be fabricated from diverse other materials, such as metals, metal alloys, or plastics, in other embodiments of my present invention.

Referring again to FIGS. 1 and 1A, it will be seen that a plurality of pillars 22a, 22b, 22c (sometimes collectively called pillars 22 herein) are mounted upon lower platform 14, and that upper platform 16 is mounted upon pillars 22.

In the first preferred embodiment of my invention pillars 22 are segments of wooden dowel, preferably selected so as to present a pleasing well-grained appearance to the observer of the device of my invention.

Also in the first preferred embodiment of my invention, pillars 22 are received in sockets of uniform depth, drilled in the upper surface of lower platform 14 and in the lower surface of upper platform 16, and are affixed therein by gluing.

It is to be understood, however, that pillars 22 may be fabricated from materials other than wood, and may be affixed to platforms 14, 16 in other ways, all within the scope of my present invention.

As further seen in FIG. 1, a plurality of compact recording disc cases 24, of the kind sometimes called "jewel cases", are carried by lower disc 14. It is to be understood that most of these cases, but not necessarily all, contain compact recording discs.

For clarity of exposition it is to be noted that the two major (large area) opposing surfaces of a typical compact disc case are hereinafter called "faces", and that the four minor (small area) surfaces of a typical compact disc case are sometimes hereinafter called "edges".

Further, it is to be noted that the edge of a typical compact disc case through which identifying matter identifying the particular compact disc contained therein can be seen (usually the hinge-bearing edge) will sometimes hereinafter be called the "spine", by way of analogy to the terminology used in connection with books.

Thus, it will be seen in FIG. 1, by those having ordinary skill in the art, informed by the present disclosure, that one of the compact disc cases 24 therein shown, has one face 24' and an edge 24" called the "spine".

The major or longer dimension of the spine of a compact disc case will sometimes hereinafter be called the "height" of that compact disc case.

As is known to those having ordinary skill in the art, the dimensions of most compact disc cases have now been commercially standardized, so that, as shown in FIG. 1, the heights of the compact disc cases 24 shown therein are substantially identical.

As further shown in FIG. 1, and in accordance with a principal feature of my present invention, a space 26 is provided between the top edges of the compact disc cases 24 and the lower surface of upper circular platform 16.

It is to be understood that in accordance with this principal feature of my invention space 26 is sufficiently large to accommodate the outer portion of the forefinger of a large human hand, or greater.

By this means it is made possible for any one of the compact disc cases 24 shown in FIG. 1 to be tilted forward by a user's index finger sufficiently to permit the grasping of that compact disc case between the user's thumb and middle finger despite the fact that, in accordance with my present invention, the compact disc cases shown in FIG. 1 are packed together on lower platform 14 with their adjacent faces in direct contact over most of their mutually confronting areas.

Figure 8:
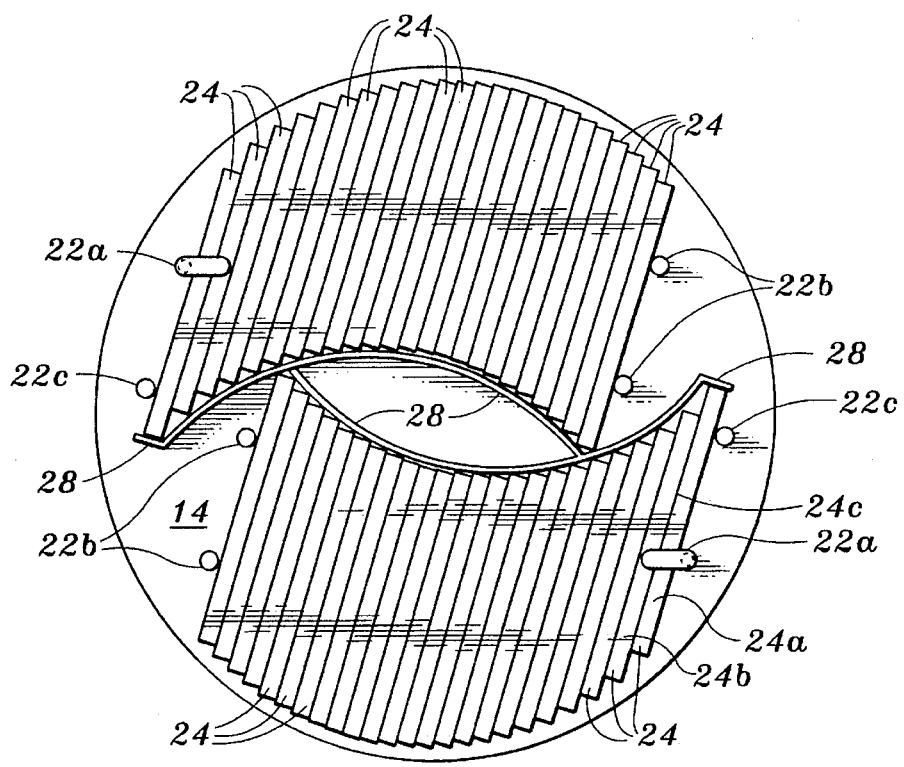
FIG. 8 is a plan view of the compact disc recording storage carousel of the first preferred embodiment of my invention as shown in FIG. 1 with the upper platform thereof removed.

As best seen in FIG. 8, which shows lower platform 14, loaded with compact disc cases 24, with upper platform 16 removed, even the compact disc cases 24a and 24b which mutually confront each other over the smallest common area 24c are in contact over a very large percentage of their adjacent faces.

The common face area over which a pair of adjacent compact disc case faces are in contact with each other will sometimes hereinafter be called the "contact area".

As further seen in FIG. 1, the inner edges of compact disc cases 24, i.e., the edges opposite the spines thereof, are in contact with a backstop 28, the structure and use whereof will be explained hereinafter in greater detail in connection with FIGS. 2 and 3.

Figure 2:
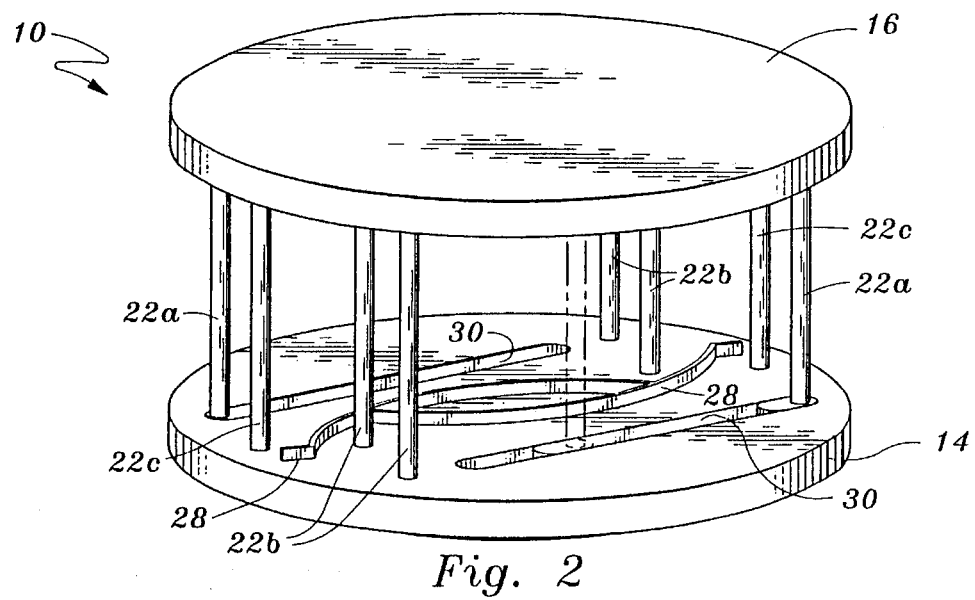
FIG. 2 is a perspective view of the compact disc recording storage carousel of FIG. 1 from which all of the compact recording disc cases shown in FIG. 1 have been removed.
Figure 3:
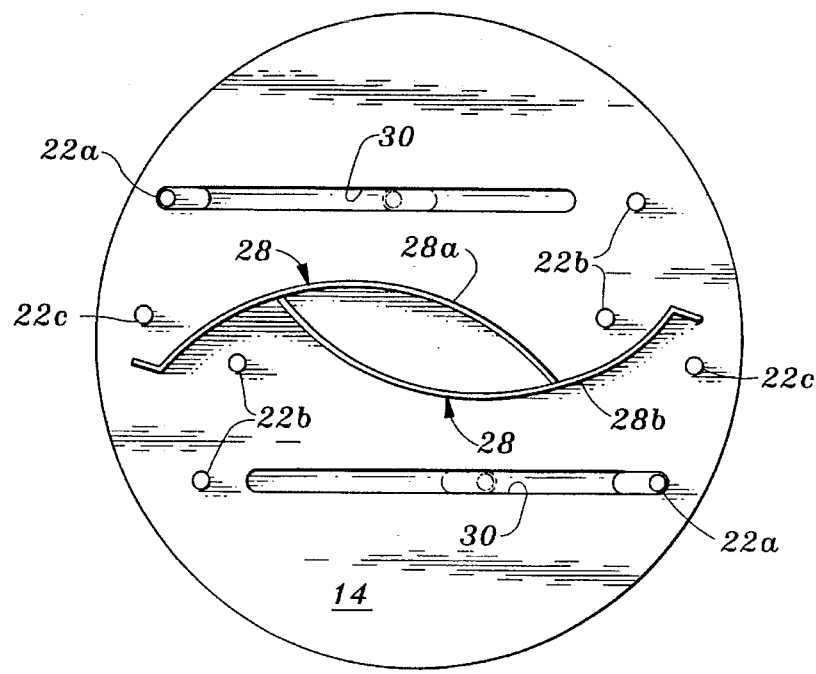
FIG. 3 is a plan view of the compact disc recording storage carousel shown in FIG. 2, from which the upper platform has been removed.

As may be seen by comparison of FIGS. 2 and 3, and in accordance with a principal feature of my invention, backstop 28 is affixed to lower platform 14 and projects from upper surface thereof.

As best seen in FIG. 3, backstop 28 can be fabricated in two parts, designated therein 28a and 28b.

In the first preferred embodiment a groove or trench is formed in the upper surface of lower platform 14 which is wide enough to close-fittingly receive parts 28a and 28b.

Parts 28a and 28b themselves are wider than the depth of said grooves, and thus when deposited in said grooves project upward from the upper surface of lower platform 14, taking the form of a "fence" as seen in FIG. 2.

While, in the first preferred embodiment, backstop 28 is made in the form of two parts 28a and 28b, which parts are cemented into grooves in the upper surface of lower platform 14, it is to be understood that the present invention is by no means limited to this particular backstop structure.

To the contrary, backstop 28 may, in some embodiments of my invention, be comprised of a lenticular, solid central pillar which extends between and is affixed at its opposite ends to platforms 14 and 16. 28 As may also be seen by comparison of FIGS. 2 and 3, two of the pillars 22 are movable pillars, which are sometimes herein referred to by the particular reference numeral 22a.

As also seen in FIGS. 2 and 3, a pair of grooves or trenches 30 are provided in the upper face of lower platform 14.

Figure 4:
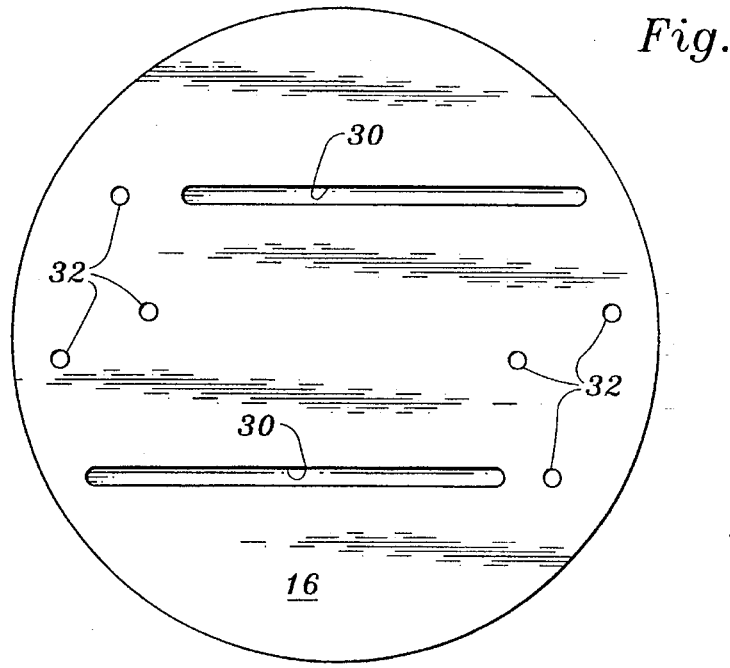
FIG. 4 is a plan view of the upper platform of the compact disc recording storage carousel shown in FIG. 2, as inverted upon a horizontal surface.

Referring now to FIG. 4, which shows the lower face of upper platform 16, there are shown a pair of trenches or grooves 30 which are formed in the lower face of upper platform 16.

Also shown in FIG. 4 are the sockets 32 which receive the upper ends of the fixed pillars 22b and 22c, i.e., all of the pillars 22 but movable pillars 22a.

It is to be particularly noted, as a feature of my present invention, that when carousel 10 is assembled each track 30 in the lower face of upper platform 16 lies directly over a corresponding track 30 in the upper face of lower platform 14.

Figure 5:
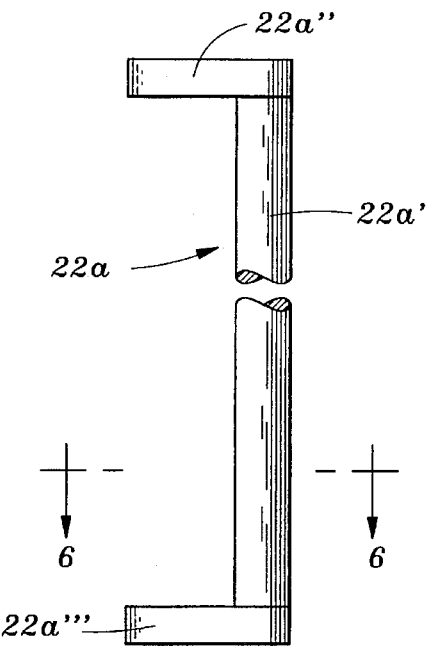
FIG. 5 is an elevational view of one of the two movable support means of the compact disc recording storage carousel shown in FIG. 2.
Figure 6:
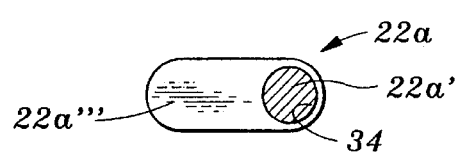
FIG. 6 is a sectional view of the movable support means shown in FIG. 5, taken on plane 6—6 of FIG. 5.

Referring now to FIGS. 5 and 6, there is shown in detail the structure of movable pillar 22a.

Comparing FIGS. 5 and 6, it will be seen that movable pillar 22a is comprised of a main cylindrical portion 22a' and two feet 22a" and 22a'".

As best seen in FIG. 6, a bore 34 passes through one end, i.e., the heel end, of foot 22a'" and main cylindrical portion 22a' is received in bore 34, wherein it is affixed, as by cementing.

It is to be understood that upper foot 22a" is also provided with a bore corresponding to bore 34, and that the upper end of main cylindrical 22a' is received in that bore and affixed therein, as by cementing.

As indicated in FIG. 5, feet 22a" and 22a'" directly overlie each other, such that the flat sides of feet 22a" and 22a'" lie substantially in the same planes, which planes lie parallel to the axis of cylindrical main portion 22a'.

As may best be seen by comparison of FIGS. 2 and 3, foot 22a'" of a movable pillar 22a is captive in one of the grooves or trenches 30 provided in the upper surface of lower platform 14, and is loose fitting in trench 30, and thus is freely movable therein.

Similarly, the upper foot 22a" of the same movable pillar 22a is captive in the overlying one of the grooves or trenches 30 provided in the lower surface of upper platform 16 (FIG. 4).

Thus, it will be understood by those having ordinary skill in the art, informed by the present disclosure, that each movable pillar 22a in a particular embodiment are captive in a corresponding pair of trenches 30 (one in the upper face of lower platform 14 and the other in the lower face of upper platform 16).

It follows, then, that when carousel 10 is fully assembled, each of the movable pillars 22a is captive in a mutually confronting pair of trenches or grooves 30, and can thus be manually translated parallel to itself so that its feet move along their respective trenches 30.

It is to be particularly noted that each lower foot 22a'" is of such thickness that when carousel 10 is assembled the upper surface of each of these feet 22a'" projects slightly above the adjoining portion of the upper surface of platform 14.

Referring now to FIG. 8, it will be seen that each one of the two arrays of disc cases 24 is captive between a pair of fixed pillars 22b and an associated movable pillar 22a.

It is further to be understood that neither array of disc cases stored in carousel 10 need be a full array of the type shown in FIG. 8.

To the contrary, each array of disc cases carried in carousel 10 may consist of any number of disc cases between zero and the maximum number as shown in FIG. 8.

When the actual number of disc cases in an array is to be less than said maximum number, the leftmost disc cases bearing against two fixed pillars 22b and the remainder of the discs in face-to-face contact, the associated movable pillar 22a need merely be manually moved until it contacts the outer face of the rightmost disc case, and all of the disc cases of this reduced array will be supported in vertical position on lower disc 14.

It is to be particularly noted that since, as explained hereinabove, the upper face of the lower foot of movable pillar 22a projects slightly above the upper face of lower disc 14, it becomes frictionally engaged with the lower edge of the disc case contacted by the main cylindrical member 22a' associated with it, and thus movable pillar 22a is automatically locked in position whenever it is brought into contact with the rightmost disc case of that array, i.e., the disc case most remote from the associated fixed pillars 22a whereby all of the disc cases in that array are supported and maintained in their vertical position.

Thus, fixed pillars 22b, and their associated movable pillar 22a are sometimes called "support pillars" or "support means" herein.

Referring now to FIG. 3, it will be seen that, in addition to support pillars 22a, 22b, each carousel 10 of the first preferred embodiment of my present invention also includes two auxiliary pillars 22c, which do not directly support the disc cases of either array, when reduced in number of cases, but rather add to the stability with which upper platform 16 is mounted on lower platform 14 and maintained immovable with respect thereto.

Figure 7:
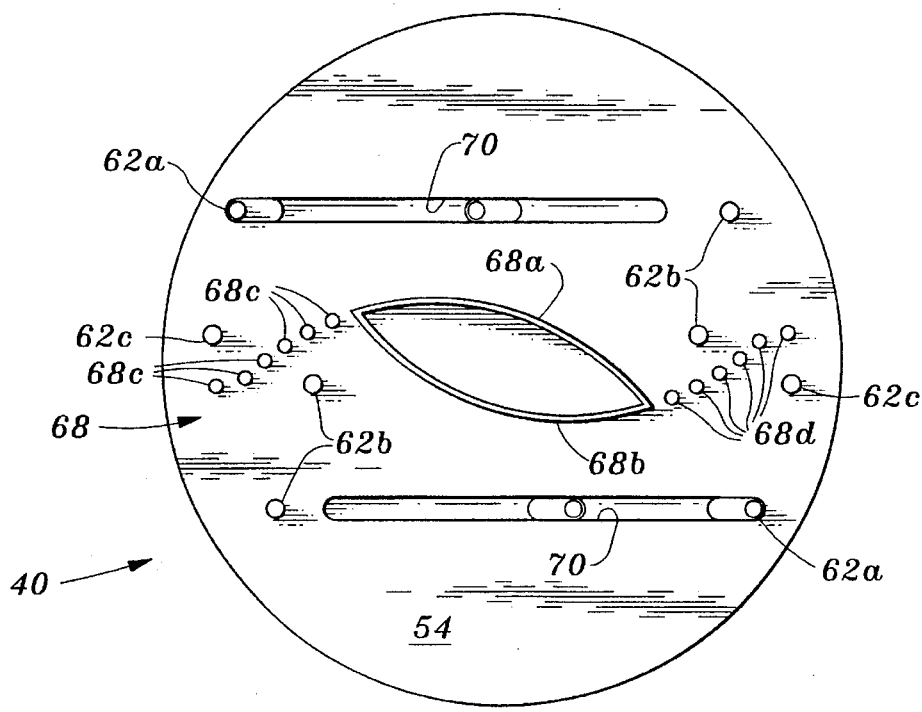
FIG. 7 is a plan view of the second preferred embodiment of my present invention, with the upper platform removed.

Referring now to FIG. 7 there is shown a compact disc recording carousel 40 constructed in accordance with the second preferred embodiment of the present invention, with its upper circular platform removed, and without any disc cases.

As seen in FIG. 7, lower circular platform 54 is provided with two grooves or trenches substantially identical to the grooves or trenches 30 of the first preferred embodiment as hereinabove described.

A pair of movable pillars 62a, which are substantially identical to movable pillars 22a of the first preferred embodiment and are freely movable in groove 70, are parts of the second preferred embodiment.

Further, a plurality of fixed pillars 62b, 62c, arc mounted on lower platform 54. Fixed pillars 62b, 62c, are substantially identical to fixed pillars 22b, 22c, of the first preferred embodiment, and are mounted on lower platform 54 in the same manner in which fixed pillars 22b, 22c, 22e are mounted on lower platform 14 of the first preferred embodiment.

As will be evident to those having ordinary skill in the art, informed by the present disclosure, carousel 40, as thus far described, is substantially identical to carousel 10 of the first preferred embodiment.

It is to be particularly noted, however, that backstop assembly 68 of the second preferred embodiment is different in many particulars from backstop 28 of the first preferred embodiment.

Returning to FIG. 7, it will be seen that backstop 68 of the second preferred embodiment is composed of a lenticular central portion comprised of two curvilinear "fence" members 68a and 68b, and is further comprised of two arrays of pillars 68c, 68d.

It is to be understood that in certain embodiments of my present invention curvilinear members 68a and 68b may be produced as a single, integrated lenticular member.

It is also to be understood that all of the pillars 68c and 68d extend from lower platform 54 to the upper platform, and are mounted in sockets provided in the upper face of lower platform 54 and the lower face of upper platform 56 in the manner described hereinabove in connection with the first preferred embodiment.

It is to be noted that each one of the pillars 68c, 68d in the device of the second preferred embodiment is so located as to serve as a backstop for a single compact disc recording case when carousel 40 is fully loaded with such disc cases.

Figure 9:
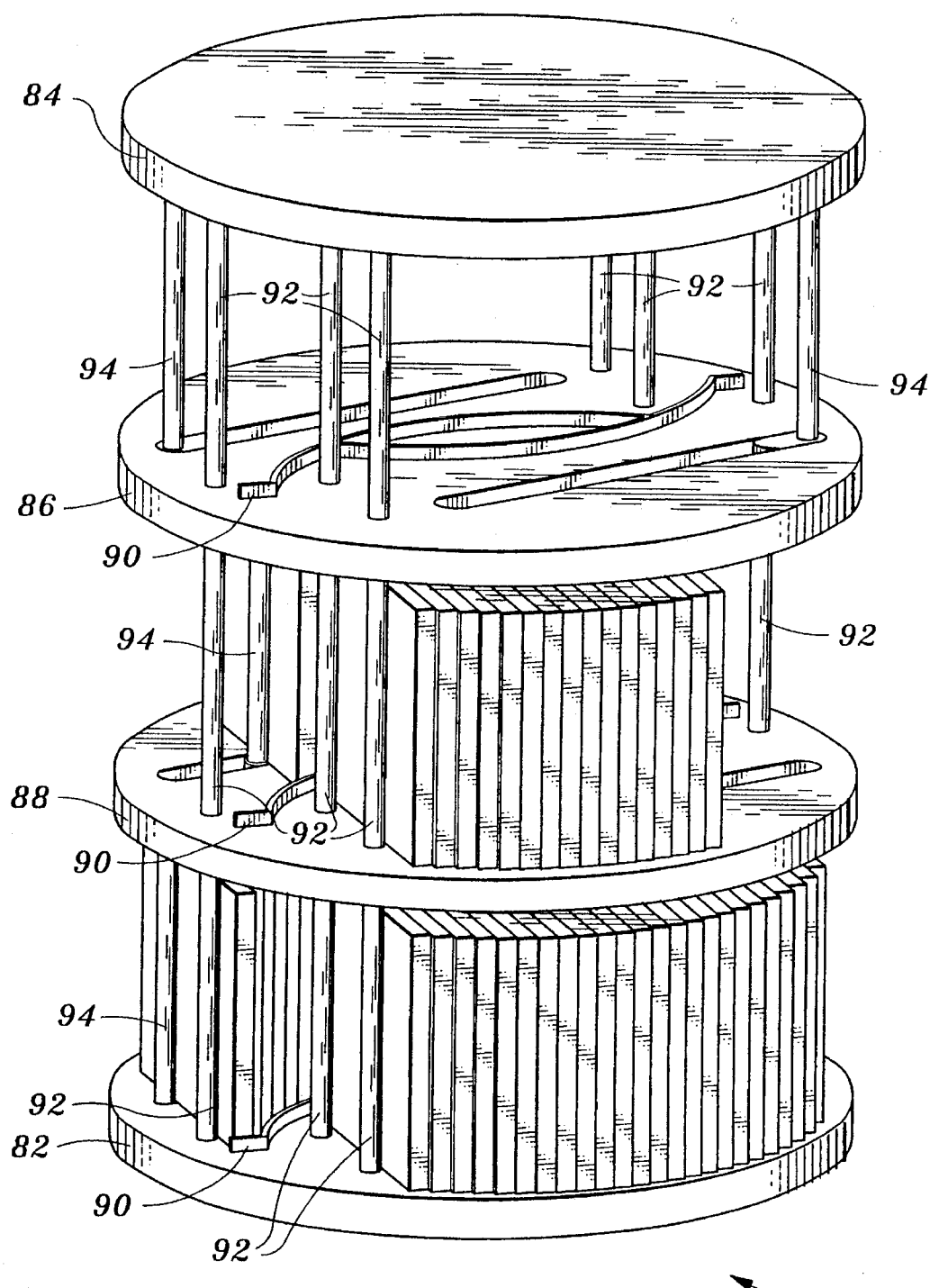
FIG. 9 is a perspective view of a multi-level compact disc recording storage carousel of the third preferred embodiment of my present invention.

Referring now to FIG. 9, there is shown a compact disc recording storage carousel 80 of the third preferred embodiment of the present invention.

Carousel 80 is a three-level carousel, which is thereby capable of storing three times as many compact disc recording cases as carousel 10 of the first preferred embodiment.

It is to be understood that unless otherwise described here the parts of carousel 80 are substantially identical to the parts of carousel 10 of the first preferred embodiment.

Thus, it will be understood that the turntable bearing of the third preferred embodiment of the present invention is substantially identical to the turntable bearing 18 of the first preferred embodiment of the present invention.

It will also be evident to those having ordinary skill in the art, informed by the present disclosure, that lower circular platform 82 and upper circular platform 84 of the third preferred embodiment are substantially identical to lower platform 14 and upper platform 16, respectively, of the carousel of the first preferred embodiment.

The upper intermediate platform 86 and the lower intermediate platform 88 (FIG. 9) of the third preferred embodiment, however, differ from either upper platform 84 or lower platform 82 in that the upper face of each of these intermediate platforms is provided with substantially the same troughs and pillar sockets as the upper face of lower platform 14 of the first preferred embodiment (FIG. 3), and the lower face of each of these intermediate platforms is provided with troughs and pillar sockets substantially identical to those of the lower face of upper platform 16 of the first preferred embodiment (FIG. 4).

Further, as seen in FIG. 9, the upper face of each one of the three lower platforms of carousel 80 of the third preferred embodiment is provided a backstop 90 which is substantially identical to backstop 28 of the first preferred embodiment, and which is mounted in a groove substantially identical to the groove which contains the lower portion of backstop 28 of the first preferred embodiment.

Yet further, carousel 80 of the third preferred embodiment includes fixed and auxiliary pillars 92 and movable pillars 94, all assembled to the other parts of carousel 80 in the manner in which the fixed and auxiliary pillars and the movable pillars of the first preferred embodiment are assembled to their associated platforms.

In a variant of the first preferred embodiment of the present invention the fixed and auxiliary pillars are replaced by longer dowels, each of which serves the function of three coaxial pillars of the kind shown and described hereinabove in connection with the first preferred embodiment, each of these elongated dowels being received in a socket in the upper face of the lower platform and a socket in the lower face of the upper platform, and intermediate platforms 86 and 88 being affixed to these elongated dowels at the position shown in FIG. 9 as by cementing or nailing.

In accordance with a fifth preferred embodiment of the present invention a multi-level compact disc storage carousel may be provided by stacking, e.g., three of the carousels 10 of the first preferred embodiment in vertical array, with the turntable bearing of the second carousel disposed upon the upper platform of the first or bottom carousel, and the turntable bearing of the third carousel disposed upon the upper platform of the second carousel, taking care to maintain substantial alignment between the axes of the turntable bearings of the three carousels.

It will thus be seen that the objects set forth above, among those made apparent from the preceding description, are efficiently attained, and since certain changes may be made in the above constructions without departing from the scope of my present invention, it is intended that all matter contained in the above description or shown in the accompanying drawings shall be interpreted as illustrative only, and not in a limiting sense.

It is also to be understood that the following claims are intended to cover all of the generic and specific features of my invention hereindescribed, and all statements of the scope of my invention which, as a matter of language, might be said to fall therebetween.

What is claimed is:

1. The combination of a storage carousel and a plurality of disc recordings contained respectively in disc recording cases each of which has a hinged spine, comprising:

a first platform mounted on a turntable bearing and thus being rotatable about a vertical axis, and having at least one curvilinear edge portion;

a second platform maintained in a predetermined position above said first platform by at least one support member;

disc recording case supporting means for maintaining a plurality of said disc recording cases upright upon said first platform;

curvilinear backstop means so positioned and configured that the spines of a selected plurality of disc recording cases which are resting on said first platform, are supported by said disc recording case supporting means, are in contact with said curvilinear backstop means, and are in face-to-face contact over a major part of their confronting faces lie within a predetermined distance from said at least one curvilinear edge portion.

2. The combination claimed in claim 1 in which one of said disc recording case supporting means is movable to accommodate arrays of different numbers of said disc recording cases.

3. The combination claimed in claim 1 in which said first and second platforms are circular.

4. The combination claimed in claim 1 in which a plurality of said disc recording case supporting means and a plurality of said curvilinear backstop means are mounted on said first platform.

5. The combination claimed in claim 2 in which said first and second platforms are circular.

6. The combination claimed in claim 4 in which a plurality of said disc recording case supporting means and a plurality of said curvilinear backstop means are mounted on said first platform.

* * * * *